US005510903A

United States Patent [19]
Matsumura

[11] Patent Number: 5,510,903
[45] Date of Patent: Apr. 23, 1996

[54] DIGITAL VIDEO TAPE RECORDER

[75] Inventor: Osamu Matsumura, Chiba, Japan

[73] Assignee: Sony Corporation, Tokyo, Japan

[21] Appl. No.: 468,127

[22] Filed: Jun. 6, 1995

Related U.S. Application Data

[63] Continuation of Ser. No. 90,926, Jul. 14, 1993, abandoned.

[30] Foreign Application Priority Data

Jul. 24, 1992  [JP]  Japan .................................. 4-217473

[51] Int. Cl.$^6$ ............................... H04N 5/76; H04N 5/92
[52] U.S. Cl. ........................................ 358/335; 358/310
[58] Field of Search ................................. 358/335, 310, 358/340, 320, 337, 339; 360/32, 33.1; 348/395, 420; H04N 5/76, 5/92

[56] References Cited

U.S. PATENT DOCUMENTS

| | | | |
|---|---|---|---|
| 4,985,784 | 1/1991 | Tsuboi et al. .......................... | 358/335 |
| 5,130,861 | 7/1992 | Suma ...................................... | 358/310 |
| 5,257,141 | 10/1993 | Matsumi et al. ........................ | 360/32 |
| 5,287,196 | 2/1994 | Yamashita et al. ..................... | 358/320 |

FOREIGN PATENT DOCUMENTS 0492528  7/1992  European Pat. Off. .

OTHER PUBLICATIONS

IEEE Transactions on Consumer Electronics vol. 37, No. 3, Aug. 1991, New York US pp. 275–282 XP000263196 Yoneda et al. 'An Experimental Digital VCR with New DCT-Based Bit-Rate Reduction System' p. 277, right column, paragraph 3, FIGS. 1–2, 4.
International Conference on Acoustics, Speech and Signal Processing Apr. 1988, New York, N.Y., US pp. 1312–1315 XP000040488 Aartsen et al. 'Error resilience of a video codec for low bitrates' p. 1313, left column, paragraph 3–paragraph 4, FIGS. 2–3.
Symposium Record Broadcast Sessions Jun. 1989, Montreux, CH pp. 410–420 XP000041133 Barbieri et al. 'A Modular Flexible Video Codec Architecture for Application to TV and HDTV' p. 412, paragraph 3–p. 415, paragraph 2, FIG. 1.

Primary Examiner—Tommy P. Chin
Assistant Examiner—Huy Nguyen
Attorney, Agent, or Firm—William S. Frommer

[57] ABSTRACT

In a digital video tape recorder which employs discrete cosine transformation and variable length coding for compressing the data to be recorded, the necessity of an additional signal line for transmission of information incidental to the principal data is eliminated, and a processing margin is obtained in track units upon variable speed reproduction and the like. The digital video tape recorder samples an NTSC signal at a ratio of 4:1:1 or 4:2:0, transforms the sample data for each block of 8×8 data by DCT, encodes the transformed data into variable length codes so that 30 DCT blocks constitute a buffering unit having a fixed length to compress the data, and segmentally records the video signal obtained by the data compression divisionally in 10 tracks for each frame. In the digital video tape recorder, the frequency of a signal processing clock signal used for data compression is selected to be equal to 192/143 times the frequency of 13.5 MHz used for sampling the original analog component video signal when converting the same to digital form. A first blanking area for transmission of the incidental information is provided for each DCT block, and a second blanking area is provided for each track for obtaining the desired processing margin in track units upon variable speed reproduction and the like.

7 Claims, 3 Drawing Sheets

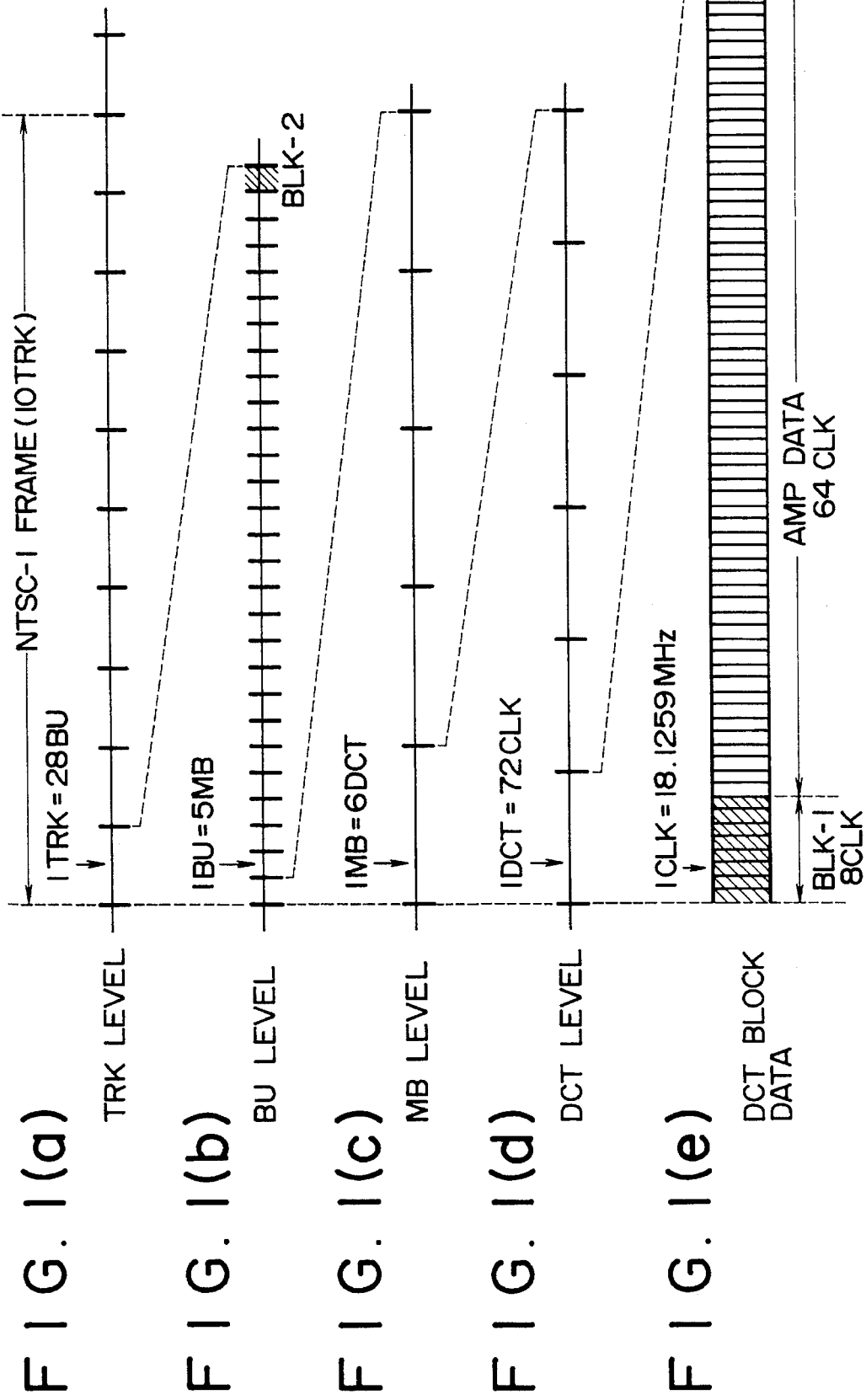

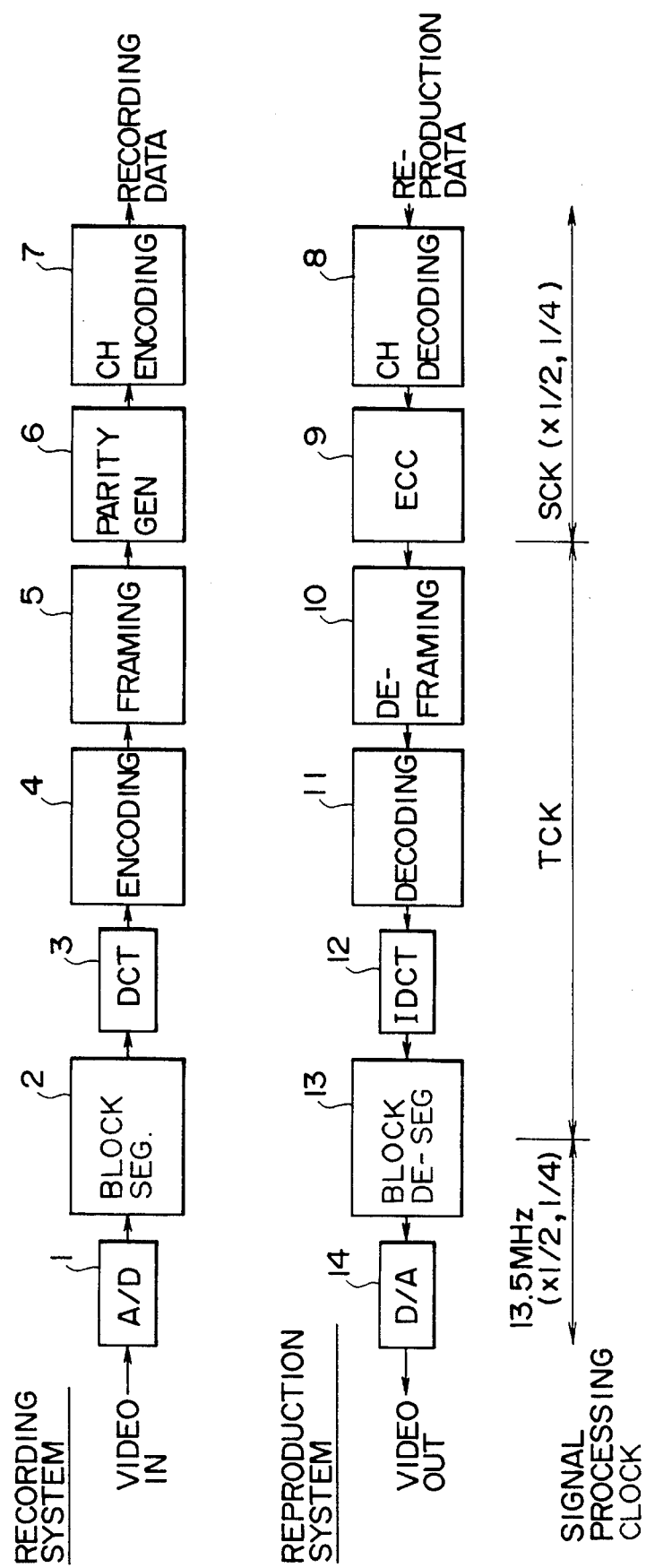

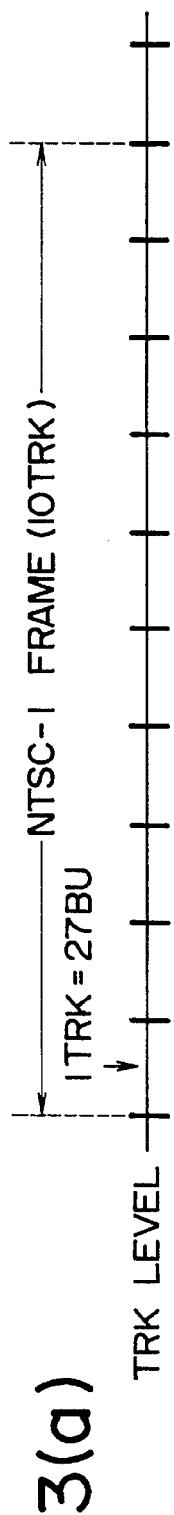
FIG. 3(a) TRK LEVEL
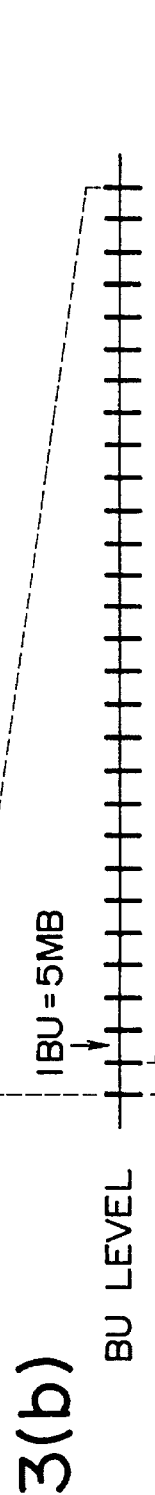
FIG. 3(b) BU LEVEL
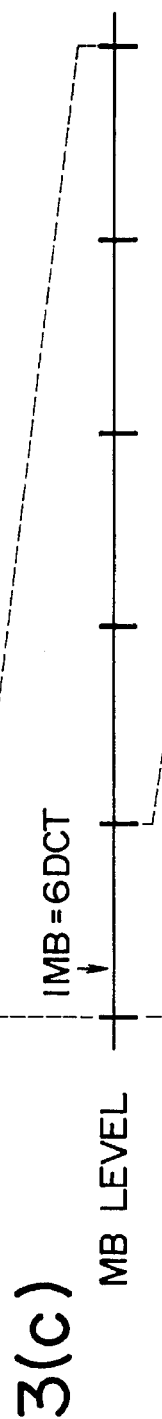
FIG. 3(c) MB LEVEL
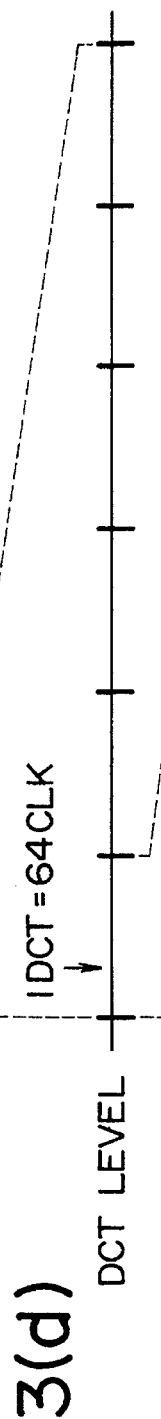
FIG. 3(d) DCT LEVEL
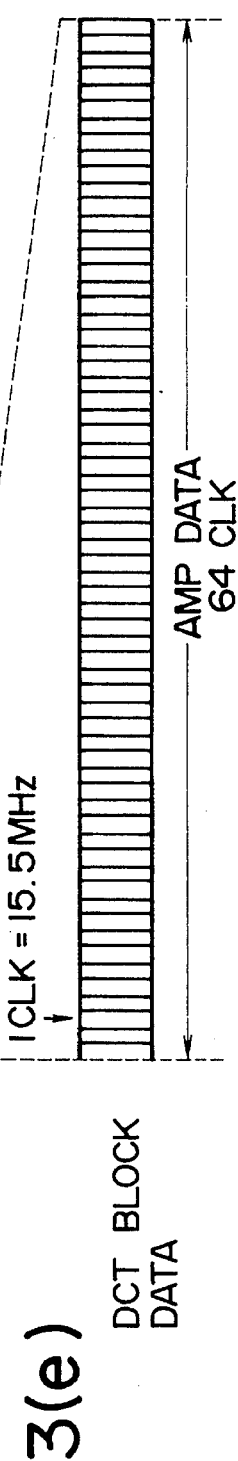
FIG. 3(e) DCT BLOCK DATA

DIGITAL VIDEO TAPE RECORDER

This application is a continuation of application Ser. No. 08/090,926, filed Jul. 14, 1993 abandoned.

BACKGROUND OF THE INVENTION

1. Field of the Invention

This invention relates to a digital video tape recorder (DVTR) wherein discrete cosine transformation (hereinafter referred to as DCT) and variable length coding are employed for compressing the data to be recorded.

2. Description of the Related Art

Professional or broadcasting digital video tape recorders embodying the D1 format, the D2 format and the D3 format have been placed on the market. In addition, various formats have been proposed for consumer-type digital video tape recorders in order to promote the more widespread use of digital video tape recorders.

Referring now to FIG. 2 which shows the general construction of a video signal processing system of a digital video tape recorder employing DCT and variable length coding for data compression, it will be seen that the video input signals in the form of analog component video signals (Y, R-Y, B-Y) are supplied to an analog to digital (A/D) converter 1 for sampling therein, for example, at the ratio of 4:1:1 (with the Y signal being sampled at the rate of 13.5 MHz, and the R-Y signal and the B-Y signal being each sampled at the rate of 3.375 MHz). Alternatively, the analog component video signals (Y, R-Y, B-Y) may be sampled at the ratio of 4:2:0 (with the Y signal being sampled at the rate of 13.5 MHz, and the R-Y signal and the B-Y signal being sampled line-sequentially at the rate of 6.75 MHz). The A/D converter 1 converts the sampled video signals into digital data supplied to a block segmentation circuit 2 in which the digital data are formed into data blocks each including 8 samples in each line in the horizontal direction and 8 lines in the vertical direction (hereinafter referred to as an 8×8 data unit). The resultant data is shuffled and Y/C-multiplexed. Each of the 8×8 units is then discrete cosine transformed by a DCT circuit 3 to convert the data therein from the time domain into the frequency domain, so that each DCT converted block (hereinafter referred to as a DCT block) includes a DC component and one or more AC components. The discrete-cosine-transformed data is then re-quantized by an encoder 4 and variable-length encoded therein for data compression by a technique such as two-dimensional Huffman coding.

In the above-described system, the step width used in the re-quantization process is selected separately for each successive group of thirty DCT blocks, each group also being referred to herein as a buffering unit, so that when the data is re-quantized the amount thereof will not exceed a certain level, that is, each buffering unit has a fixed length. The thirty DCT blocks of each buffering unit may, for example, consist of twenty DCT blocks of the Y signal and ten DCT blocks of the C signal, with each buffering unit being formed into, for example, five macroblocks (FIG. 3(c)) each including six DCT blocks of data arranged successively as two luminance blocks Y, followed by a color component block C, followed in turn by a further two luminance blocks Y and finally followed by a color component block C. A framing circuit 5 serves to vertically align a plurality of buffering units as described above into a larger unit which is combined with an error correction code (ECC) by a parity generator 6. The data as thus constituted is then converted by means of a channel encoder 7 into serial form for recording. In the course of such recording, the data of one frame is divided among ten tracks, as shown in FIG. 3(a).

When the data in serial form is reproduced, it is detected and converted to parallel form by means of a channel decoder 8 and then error-corrected by an ECC circuit 9. The error-corrected data is then separated into the variable-length code words of each block by a de-framing circuit 10 and subsequently decoded and de-quantized by a decoder 11. The resultant data is then inversely discrete cosine transformed by an inverse DCT circuit (IDCT) 12 to yield 8×8 unit blocks of time domain data.

The data blocks as thus reproduced are de-shuffled, Y/C demultiplexed and data-interpolated by a block desegmentation circuit 13 to recover the digital component video signal. Finally, the digital video signal is converted by a D/A converter 14 into a reproduction of the original analog component video signal to be output by the reproducing system of FIG. 2.

The digital video tape recorder records the video data compressed by the video signal processing system described above along with compressed audio data, controlling digital subcodes, an ATF pilot signal for tracking control, ECC parities, preambles and postambles for the extraction of clocks and so forth in a predetermined track format on a magnetic tape. The signals described above for one frame are recorded segmentally or divisionally in a plurality of oblique tracks on the magnetic tape. For example, in the case of video signals according to the NTSC system, the compressed video data for each frame and the other associated data are recorded in ten oblique tracks on the magnetic tape.

The digital video tape recorder described above has the following numbered characteristics:

(1) Sampling frequency or rate ratio=4:1:1 or 4:2:0.
(2) Effective Data: horizontal 720 dots×vertical 480 dots for the Y signal and horizontal 360 dots×vertical 480 dots for the C signal. Accordingly, 720×480+360×480=518,400 dots for each frame.
(3) DCT in units of 8×8 data.
(4) Variable length coded so that thirty DCT blocks may have a fixed length.
(5) Segment recording of one frame divided among 10 tracks. Accordingly, 518,400÷10÷30÷(8×8)=27 fixed length buffering units in each track, as on FIG. 3(a).

Signal processing clocks in the digital video tape recorder are selected in the following manner:

(a) The analog to digital converter 1 and the digital to analog converter 14 each operate with clock signals of 13.5 MHz and one half and one quarter of 13.5 MHz.

(b) The signal processing clock signal SCK of the recording and reproducing section constituted by the parity generation circuit 6, the channel encoder 7, the channel decoder 8 and the ECC circuit 9 is defined from a tape pattern and the speed of rotation of a head drum and includes a basic clock signal of 40 MHz or so and clock signals of one half and one quarter of 40 MHz.

(c) The signal processing clock signal TCK of the data compression section constituted by the block segmenting circuit 2, the DCT circuit 3, the encoding circuit 4 and the framing circuit 5, and of the data decompression section constituted by the deframing circuit 10, the decoding circuit 11, the IDCT circuit 12 and the block desegmenting circuit 13 is 518,400 (CLK) per frame. Since the NTSC field rate is actually 59.94 Hz, the frequency of the signal processing clock signal TCK is ≈15.54 MHz.

With the conventional digital video tape recorder, 64 clocks are allocated to each DCT block or unit, as shown in FIG. 3(e). Therefore, another signal line or channel is required for the transmission of information incidental to the principal data, such as motion information of the DCT blocks, activity information representative of the amount of high frequency components in a DCT block, data interpolation information and the like.

Further, in the event of fluctuations in the duration, timing, data amount and so forth of a video signal of one track actually reproduced in one track (TRK) period (FIG. 3(a)) of the video signal processing system described with reference to FIG. 2, for example, as in the case when variable speed reproduction is performed, then it is difficult to adapt operation of the signal processing system to the actual reproduced data.

OBJECTS AND SUMMARY OF THE INVENTION

Accordingly, it is an object of the present invention to provide a digital video tape recorder which eliminates the necessity of an additional signal line for transmission of information incidental to the principal data.

It is another object of the present invention to provide a digital video tape recorder which can perform processing appropriate for the actual reproduced data even when there are fluctuations in the timing, duration, data amount and so forth of a video signal of one track actually reproduced in one track period of a video signal processing system as aforesaid.

In order to attain the foregoing objects, a digital video tape recorder which compresses the data representing a video signal by discrete cosine transformation and variable length coding is, in accordance with an aspect of the present invention, provided with a blanking area for each discrete cosine transform or DCT block. Such blanking area for each DCT block may be used for transmitting information incidental to the principal data, or as a buffer in respect to the time required for motion detection processing of a DCT block.

According to another aspect of the present invention, there is provided a digital video tape recorder which effects discrete cosine transformation of a video signal, encodes the data obtained by the discrete cosine transformation into variable length codes so that a buffering unit constituted by a predetermined number of DCT blocks has a fixed length for compressing the data, whereafter the video signal in the form of the compressed data for each frame is recorded by segment recording in a number of tracks on a magnetic tape, with a blanking area being provided for each track.

With the digital video tape recorder according to this invention, as aforesaid, even when fluctuations occur in the timing, duration, data amount and so forth of a video signal of one track actually reproduced in one track period of the described system, for example, due to variable speed reproduction or the like, operation of the signal processing system can be adapted to the actual reproduced data. Consequently, a processing margin measurable in track units can be obtained upon variable speed reproduction or the like.

According to a further aspect of the present invention, there is provided a digital video tape recorder which samples an NTSC signal at a ratio of 4:1:1 or 4:2:0, effects discrete cosine transformation of the data obtained by the sampling for each block of 8×8 data, encodes the data obtained by the discrete cosine transformation into variable length codes so that a buffering unit constituted by thirty DCT blocks has a fixed length for compressing the data, and segment records the video signal obtained by the data compression in ten oblique tracks for each frame, with the frequency of a signal processing clock signal used for data compression being selected to be equal to 192/143 times 13.5 MHz.

With the digital video tape recorder, as aforesaid, information incidental to the principal data can be transmitted making use of a first blanking area for each discrete cosine transform block. Further, such first blanking area can be used as a buffer for the time required for motion detection processing of a DCT block. Moreover, by providing a second blocking area for each track, even when there is fluctuation of the timing, duration, data amount and so forth of a video signal of one track actually reproduced for a one track period of the video signal processing system, for example, upon variable speed reproduction or the like, operation of the circuit system can be adapted to the actual reproduced data. Consequently, a processing margin in track units can be obtained upon variable speed reproduction or the like. Furthermore, since the steps of processing of the DCT blocks which form the base for such processing are synchronized with the horizontal scanning frequency of the video signal, the circuit construction is simplified.

According to a still further aspect of the present invention, there is provided a digital video tape recorder which transforms a video signal by discrete cosine transform, codes the data obtained by the discrete cosine transform into variable length codes so that a buffering unit constituted from a predetermined number of DCT blocks has a fixed length for compressing the data, and records the video signal in the form of compressed data by segment recording such data for each frame in a predetermined number of oblique tracks on a magnetic tape, with a blanking area being provided for each DCT block, and with each track being constituted by a plurality of the buffering units.

With the digital video tape recorder as aforesaid, processing timings of the DCT blocks, buffering units and tracks are synchronized with each other so that the circuit construction is simplified.

The above and other objects, features and advantages of the present invention will become apparent from the following detailed description of an illustrative embodiment when read in conjunction with the accompanying drawings in which like parts or elements are denoted by like reference characters.

BRIEF DESCRIPTION OF THE DRAWINGS

FIGS. 1(a)–1(e) are timing charts showing timing signals employed in a data compression section of a digital video tape recorder according to an embodiment of the present invention;

FIG. 2 is a block diagram showing the general construction of a video signal processing system of a consumer-type digital video tape recorder which employs DCT and variable length coding for achieving data compression and to which the present invention may be desirably applied; and FIGS. 3(a)–3(e) are timing charts similar to those of FIGS. 1(a)–1(e) but showing timing signals conventionally employed in the data compression section of the video signal processing system of FIG. 2.

DETAILED DESCRIPTION OF THE PREFERRED EMBODIMENT

It is to be noted that a digital video tape recorder according to one embodiment of the present invention has basically the same construction as the conventional digital video tape recorder previously described with reference to FIG. 2 and has the characteristics of the conventional digital video tape recorder listed above in the paragraphs numbered (1) to (5) except as hereinafter described in detail with reference to FIGS. 1(a) to 1(e). Therefore, for the sake of brevity, the digital video tape recorder according to an embodiment of the present invention will be described in detail only to the extent it differs, either structurally or in its timing characteristics, from the signal processing system and its timing signals shown in FIG. 2 and FIGS. 3(a) to 3(e), respectively.

Before the digital video tape recorder according to an embodiment of the present invention is described in detail, the frequencies of the signal processing clock signals of the digital video tape recorder shown in FIG. 2 will be considered.

First, the signal processing clock signal TCK of the data compression section constituted by the block segmenting circuit 2, the DCT circuit 3, the encoding circuit 4 and the framing circuit 5 and the data decompression section constituted by the deframing circuit 10, the decoding circuit 11, the IDCT circuit 12 and block desegmenting circuit 13 must necessarily be higher than the sampling frequency 13.5 MHz for the Y signal since the three component signals (Y, R-Y, B-Y) are multiplexed and processed by a single circuit.

Although the signal processing clock signal SCK of the recording and reproduction section constituted by the parity generation circuit 6, the channel encoder 7, the channel decoder 8 and the ECC circuit 9 is defined from the tape pattern and the speed of rotation of the head drum, since compressed video data and additional data including, for example, compressed audio data, digital subcodes, an ATF pilot signal, ECC parities, preambles and postambles, and so forth are recorded in a multiplexed condition in tracks on a magnetic tape (not shown), the signal processing clock signal SCK need not necessarily be equal to the signal processing clock TCK of the data compression section and the data decompression section.

Accordingly, the frequency of the signal processing clock TCK of the data compression section and the data decompression section can be selected arbitrarily.

Selection of the frequency of the signal processing clock TCK of the data compression section and the data decompression section will now be investigated.

The units involved in signal processing include the DCT block, the buffering unit (BU), and the track (TRK). Since processing at the recording and reproducing section is performed in track units, processing at the data compression section and the data decompression section should be synchronized with processing for a track. Further, since reproduced data are passed through a PLL (phase locked loop) to produce a clock signal, the frequency of the signal processing clock signal TCK preferably has a simple integral ratio to the horizontal scanning frequency of the input NTSC signal. Moreover, when processing at the data compression section and the data decompression section is taken into consideration, the processing will be simplified if the three units mentioned above, that is, the DCT block, the buffering unit and the track, are all synchronized with each other. Additionally, when information incidental to the principal data, such as, motion information of DCT blocks, activity information representative of the amount of high frequency components in a DCT block and data interpolation information, is taken into consideration, it should be possible to provide a blanking area for data and to multiplex such information incidental to the principal data into the blanking area.

Taking all of the foregoing into consideration, a frequency of approximately 18.1259 MHz is selected for the signal processing clock signal TCK for the data compression section and the data decompression section. This frequency (≈18.1259 MHz) is a simple integral ratio (192:143) of the sampling frequency (13.5 MHz) of the analog to digital converter 1.

As shown on FIGS. 1(d) and 1(e), in accordance with the present invention, each DCT block is provided with a first blanking area BLK-1, and, as shown on FIGS. 1(a) and 1(b), each track TRK is provided with a second blanking area BLK-2. More specifically, in the illustrated embodiment of the invention, each DCT block is constituted by amplitude data for 64 clocks and by the respective first blanking area BLK-1 for 8 clocks. The first blanking area BLK-1 is utilized for transmission of information incidental to the principal data, as described hereinabove.

FIG. 1(c) shows each macroblock is constituted by 6 DCT blocks or units of Y, Y, C, Y, Y and C, respectively. Normally, shuffling of data is performed in macroblock units.

FIG. 1(b) shows each buffering unit is constituted by 5 macroblocks and thus is comprised of 30 DCT blocks or units, and, as earlier described, variable length coding at the encoder 4 is controlled so that such buffering unit BU has a fixed length.

FIG. 1(a) shows each track is constituted by 27 buffering units BU, and by a respective second blanking area BLK-2 which corresponds, in extent, to a 28th buffering unit, that is, each second blanking area BLK-2 comprises 2160 clocks. The second blanking area BLK-2 provide a processing margin in track units upon variable speed reproduction or the like. Further, since the effective number of buffering units per track is set to an even number, that is, in effect 28 buffering units are provided per track, two-phase conversion processing for dispersing processing to two circuit systems is facilitated.

It will be seen that, with the frequency ≈18.1259 MHz being selected for the processing clock signal TCK for the data compression and decompression sections, and with there being 72 clocks in each DCT block, 30 DCT blocks in each buffer unit BU, and 28 buffering units or equivalent in each track, as earlier described, 60,480 clocks (CLK) are provided for each track in the data compressing and decompressing sections.

Considering that the A/D converter 1 samples at the rate of 13.5 MHz, which corresponds to 858 samples for each horizontal scanning period including a horizontal blanking period, the number of samples for each horizontal scanning period at the selected clock frequency of 18.1259 MHz, is 1152, that is, 192/143×858. That sample number 1152 is 16×72, that is, a whole multiple of the number of clocks in each DCT block according to the invention, so that the timings of the DCT blocks are synchronized with the horizontal scanning frequency. Further, the number of clocks for each DCT block, that is, 72, has a large number of divisors including 2, 3, 6, 8 and 12, and thus is a number that is easy to handle in designing the circuitry.

The signal processing clock signal TCK with its frequency selected as described above in accordance with this invention can be used in the data compressing and decompressing sections of a signal processing system of a digital video tape recorder other than that specifically described above. Thus, for example, the disclosed signal processing clock signal TCK could be employed in an arrangement wherein each buffering unit is constituted by 40 DCT blocks or in an arrangement wherein one frame is constituted by 5 tracks.

The following additional modifications may be employed:

1. While, in FIG. 1(b) each buffering unit is constituted by 30 DCT blocks of data each comprised of a first blanking area for 8 clocks and amplitude data for 64 clocks, the order of transmission of the first blanking area and the amplitude data may be changed. For example, with each buffering unit still constituted by 30 DCT blocks, the first blanking area of two DCT blocks may be transmitted in sequence and then followed by the transmission of the amplitude data of two DCT blocks.

2. A blanking area may be provided for each macroblock.

3. The sampling frequencies of the component signals, the number of dots constituting a DCT block, the number of DCT blocks constituting a buffering unit, and/or the number of tracks constituting one frame may be changed, provided that, in such instances, there is at least a first blanking area for each DCT block, there is preferably also a second blanking area for each track, and the frequency of the signal processing clock used for data compression is selected to be an integral ratio of the sampling frequency used in the analog to digital converter, which integral ratio results in a number of samples for each horizontal scanning period at the selected clock frequency which is a whole multiple of the number of clocks in each DCT block.

Having fully described a preferred embodiment of the invention and specific modifications thereof, it will be apparent to one of ordinary skill in the art that many changes and additional modifications can be made therein without departing from the spirit and scope of the invention as defined in the appended claims.

What is claimed is:

1. A digital video tape recorder comprising:

means for sampling an input analog video signal at a predetermined rate and converting the resulting samples into digital data;

means for forming said digital data into data blocks each including data corresponding to a predetermined number of said samples; and means for compressing the data of said data blocks including means for discrete cosine transforming said data blocks so as to convert said data therein from a time domain to a frequency domain, means for assembling the converted data into respective discrete cosine transformed (DCT) blocks each of which has a respective first blanking area in which information incidental to the converted data may be contained, means for variable-length coding said DCT blocks to produce buffering units, each constituted by a predetermined number of said DCT blocks in succession, of equal length; and further comprising means for segment recording compressed data representing a frame of the input video signal among a plurality of tracks on a recording tape, with each of said tracks containing a predetermined number of said buffering units and a second blanking area, not occupied by said compressed data, which, during the reproduction of the respective track, provides an interval for processing said buffering units contained in the respective track.

2. A digital video tape recorder as in claim 1; wherein said second blanking area on each of said tracks is equivalent, in extent, to each of said buffering units.

3. A digital video tape recorder as in claim 1; wherein said input analog video signal is an NTSC signal composed of analog component video signals (Y, R-Y, B-Y) which are sampled at the ratio 4:1:1 or 4:2:0, with the sampling rate for the luminance component (Y) being 13.5 MHz.; each of said data blocks consists of data corresponding to 64 of said samples; each of said buffering units is constituted by 30 of said DCT blocks; said segment recording of compressed data representing a frame is effected in 10 of said tracks; and said means for compressing is responsive to a signal processing clock signal having a frequency which is 192/143 times said sampling rate for said luminance component (Y) of the input analog video signal.

4. A digital video tape recorder as in claim 3; wherein each of said DCT blocks has a converted data area corresponding to 64 clocks of said signal processing clock signal and the first blanking area corresponds to 8 of said clocks.

5. A digital video tape recorder as in claim 1; wherein said means for compressing responds to a signal processing clock having a frequency which is an integral ratio of said predetermined rate at which the input analog video signal is sampled, and said integral ratio results in a number of samples for each horizontal scanning period at said frequency of the signal processing clock which is a whole multiple of a number of the clocks of said signal processing clocks in each of said DCT blocks.

6. A digital video tape recorder as in claim 5; in which said rate at which the input analog signal is sampled is 13.5 MHz., said integral ratio is 192/143, said number of said clocks in each of said DCT blocks is 72 with 64 clocks corresponding to said converted data and 8 clocks corresponding to the respective first blanking area, and said number of samples for each horizontal scanning period at said frequency of the signal processing clock is 1152.

7. A digital video tape recorder as in claim 6; in which each of said buffering units is constituted by 30 of said DCT blocks, said segment recording of compressed data representing a frame divides such data among 10 of said tracks, and each of said tracks contains 27 of said buffering units and the respective second blanking area having an extent equivalent to one of said buffering units.

\* \* \* \* \*